(12) United States Patent
Hudson et al.

(10) Patent No.: US 7,548,697 B2
(45) Date of Patent: Jun. 16, 2009

(54) METHOD AND DEVICE FOR CONTROLLING A REMOTE VEHICLE

(76) Inventors: Edison Hudson, 118 Little Branch Trail, Chapel Hill, NC (US) 27517; Robert Todd Pack, 27 Vieckis Dr., Nashua, NH (US) 03062

( * ) Notice: Subject to any disclaimer, the term of this patent is extended or adjusted under 35 U.S.C. 154(b) by 25 days.

(21) Appl. No.: 11/748,463

(22) Filed: May 14, 2007

(65) Prior Publication Data
US 2008/0063400 A1    Mar. 13, 2008

Related U.S. Application Data

(60) Provisional application No. 60/747,183, filed on May 12, 2006.

(51) Int. Cl.
*H04B 10/00*    (2006.01)
(52) U.S. Cl. .................. 398/106; 398/107; 398/109
(58) Field of Classification Search ............ 398/106, 398/107, 108, 109
See application file for complete search history.

(56) References Cited

U.S. PATENT DOCUMENTS

| | | | |
|---|---|---|---|
| 4,325,146 A | 4/1982 | Lennington | |
| 4,328,545 A * | 5/1982 | Halsall et al. | 701/23 |
| 4,570,062 A * | 2/1986 | Tsumura et al. | 250/225 |
| 4,700,427 A | 10/1987 | Knepper | |
| 5,279,672 A | 1/1994 | Betker et al. | |
| 5,341,540 A | 8/1994 | Soupert et al. | |
| 5,644,126 A | 7/1997 | Ogawa | |
| 5,974,348 A | 10/1999 | Rocks | |
| 6,615,108 B1 | 9/2003 | Peless et al. | |
| 6,690,134 B1 | 2/2004 | Jones et al. | |
| 6,781,338 B2 | 8/2004 | Jones et al. | |
| 6,886,651 B1 | 5/2005 | Slocum et al. | |
| 6,955,324 B2 * | 10/2005 | Tanielian | 244/3.13 |
| 6,965,209 B2 | 11/2005 | Jones et al. | |
| 2002/0101632 A1* | 8/2002 | Meckler | 359/115 |
| 2005/0213082 A1 | 9/2005 | DiBernardo et al. | |
| 2006/0120726 A1 | 6/2006 | Yoshifusa et al. | |

FOREIGN PATENT DOCUMENTS

| | | |
|---|---|---|
| JP | 63241610 | 10/1988 |
| WO | 9741451 | 11/1997 |

* cited by examiner

*Primary Examiner*—M. R. Sedighian (57) ABSTRACT

A system and method for controlling a remote vehicle comprises a hand-held controller including a laser generator for generating a laser beam. The hand-held controller is manipulable to aim and actuate the laser beam to designate a destination for the remote vehicle. The remote vehicle senses a reflection of the laser beam and moves toward the designated destination. The hand-held controller allows single-handed control of the remote vehicle and one or more of its payloads. A method for controlling a remote vehicle via a laser beam comprises encoding control signals for a remote vehicle into a laser beam that is aimed and sent to a designated destination for the remote vehicle, and sensing a reflection of the laser beam, decoding the control signals for the remote vehicle, and moving toward the designated destination.

23 Claims, 10 Drawing Sheets

METHOD AND DEVICE FOR CONTROLLING A REMOTE VEHICLE

This application claims priority to U.S. Provisional Patent Application No. 60/747,183, entitled Robot Control Using Manual Control Device and Encoded Laser Designator, filed May 12, 2006, which is incorporated herein by reference in its entirety.

FIELD OF THE INVENTION

The present invention relates to a method and device for simplifying control of a remote vehicle. More particularly, the present invention relates to a hand-held controller capable of directing a laser beam for designating target objects and communicating control commands to the remote vehicle. The hand-held controller may be designed for single-handed operation.

BACKGROUND

Remote vehicles, such as unmanned ground, air, or surface vehicles, are typically controlled by a human operator using a console or portable computer device. The operator is required to manually actuate numerous buttons and control inputs (e.g., joysticks, mouse, pucks, levers, etc.) corresponding to the controls of motion axes and subsystems of the remote vehicle. Conventional remote vehicle control requires a trained and skilled operator, and demands concentration on the control device to efficiently drive the remote vehicle to a destination.

In addition, remote vehicles are increasingly being used in military, law enforcement, and industrial applications to provide a tool for a person to perform operations at a safe, remote distance from sites of potential danger or hazard to human beings. Such remote vehicles are being deployed for some tasks by military and civilian forces, such as bomb and ordnance disposal, in which the remote vehicle is remotely navigated to the proximity of the explosives or other potentially dangerous target by an operator located hundred of meters away, so that investigation and disarmament can take place at a safe distance.

Figure 1:
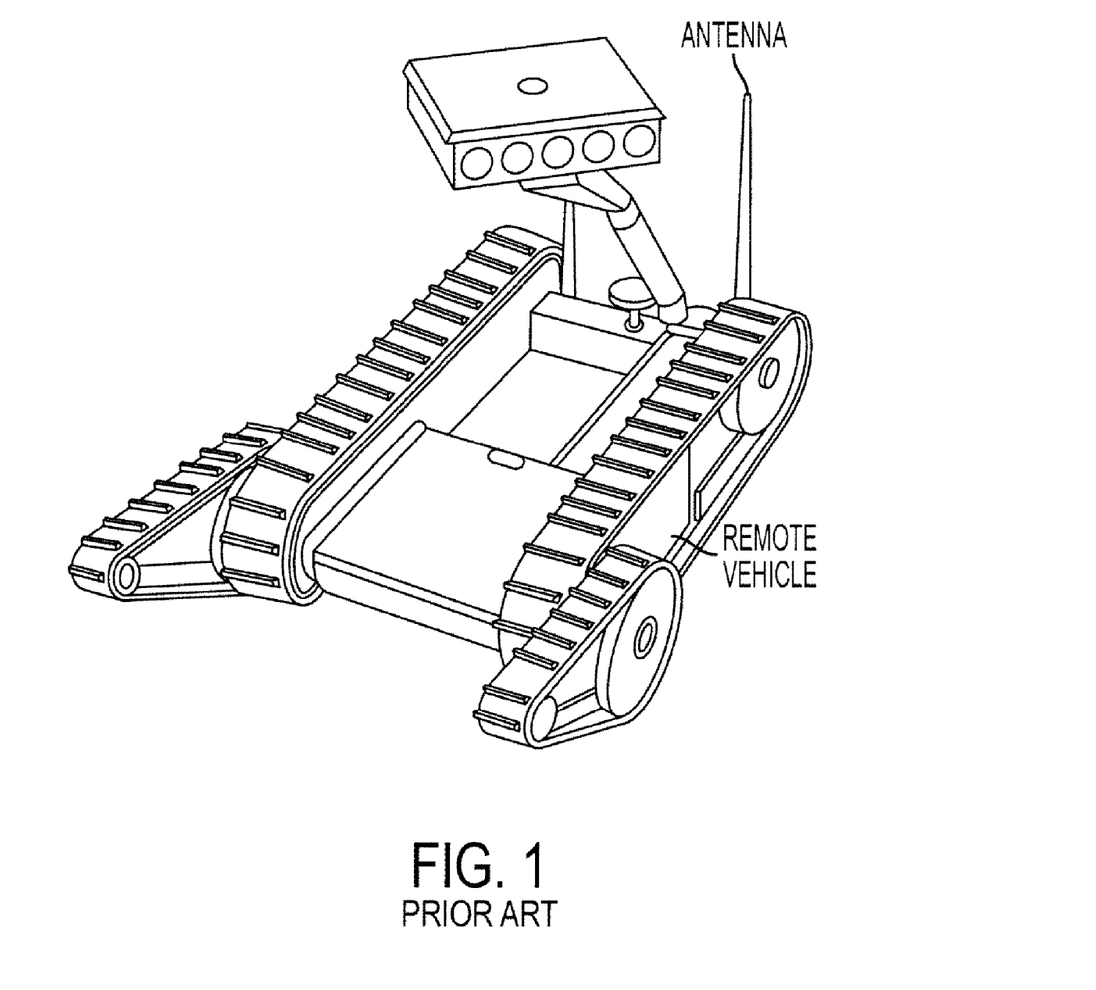
FIG. 1 illustrates a type of conventional remote vehicle.

FIG. 1 illustrates a conventional remote vehicle being wirelessly controllable at distances of hundreds of meters or more from the operator, depending presently on the limits of available wireless communication.

In typical remote vehicle operation, the operator controls the vehicle using a process known as tele-operation. Conventional remote vehicle tele-operation involves the use of operator control consoles, most commonly having joysticks, trackballs, mouse-type input devices, or some arrangement of physical switches and/or potentiometers and similar manual actuation input devices. Remote vehicles are typically configured with many axes of motion, including motion drive axes, steering axes (either physical or derived virtual steering), manipulation axes, sensor pan-tilt-zoom axes, etc. The axes of the remote vehicle often involve complex mechanical coupling between the drive actuators and the physical motion apparatus, such as wheels, tracks, rudders, heads, etc. Additionally, remote vehicle platforms typically contain many sensors, such as cameras, that can provide multiple streams of video to the operator as visual feedback to aid the operator's control. The electro-mechanical complexity of many remote vehicles has consequently made the manual control of such vehicles complex for human operators in a tele-operation process, requiring many function-specific knobs, joysticks and buttons to perform a task (see, e.g., the conventional remote vehicle control console illustrated in FIG. 2). A significant amount of operator training ad experience can be required to develop sufficient manual dexterity and skill to be able to accurately navigate and control a remote vehicle. Operation of the remote vehicle require the operator's attention, diverting it from situational awareness.

Figure 2:
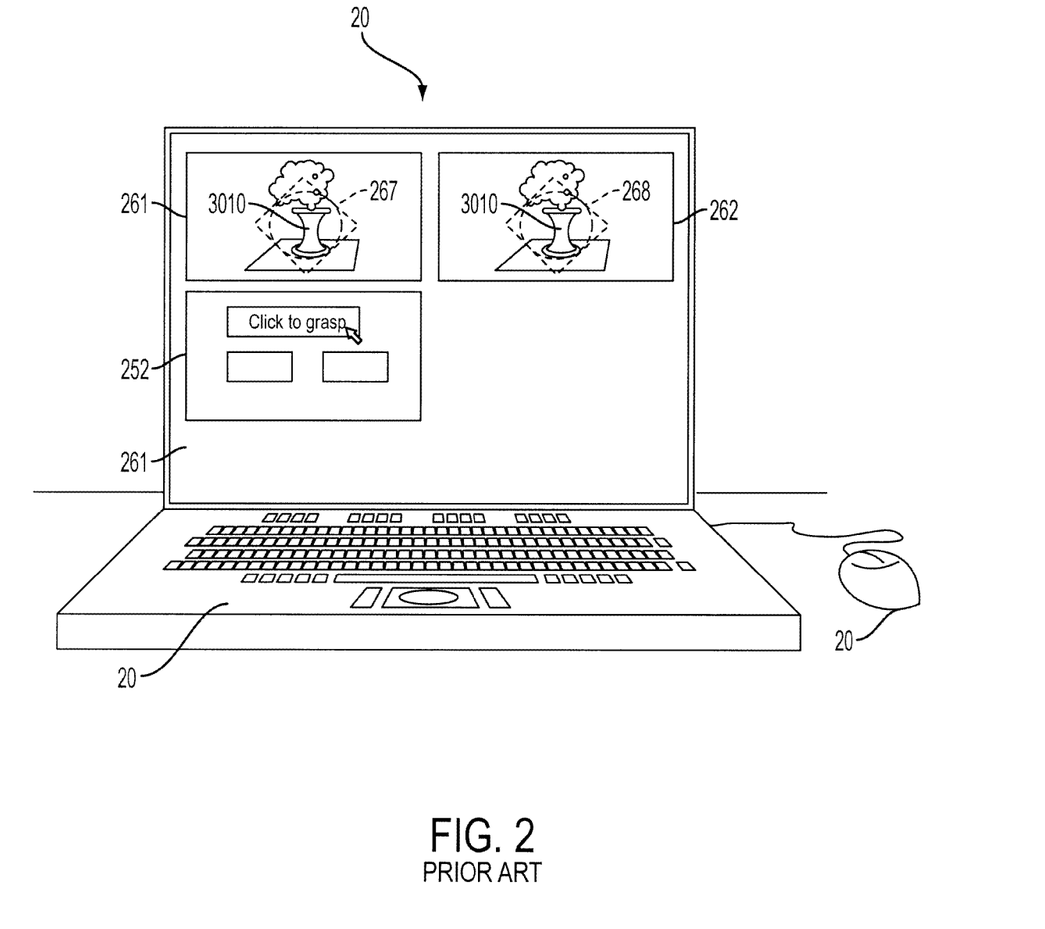
FIG. 2 illustrates a conventional remote vehicle control device/operation console.

FIG. 2 illustrates conventional remote vehicle control console, which can be used to control a mobile robot in military operations.

In various military applications, such as bomb disposal, it is known to have a bomb disposal specialist that is sufficiently trained and expert in operating the remote vehicle. To accomplish a bomb inspection or disposal task, the specialist uses many manual control knobs, levers, and joysticks, normally requiring two hands to operate and close attention to a video console. Other personnel must provide security for the remote vehicle operator and perform other tasks, because the remote vehicle operator is typically fully engaged with the complex task of tele-operation. For many tasks, such complex and attention-demanding control devices are prohibitive to the safe and efficient accomplishment of the tasks. For example, the use of remote vehicles in forward reconnaissance and patrol missions by dismounted infantry soldiers can be an operational and tactical impracticality due to the cumbersome and immersive nature of existing remote vehicle tele-operation controls.

In order for robots to be beneficial in such military activities, a method and device for directing the actions of the remote vehicle is needed that is more integrated to the normal mission actions and more intuitive to use. The device must not overly encumber the soldier/operator to the point of endangering other key operational goals, such as constant vigilance to security, and ready access to defensive weapons or other tools.

For example, conventional remote vehicle controllers typically require two-handed operation or otherwise highly constrain the motion and the visual attention of the operator. Control devices such as game controllers, commonly used for video gaming systems, offer a familiar format and reasonably good ergonomics, but normally require the use of both hands by the operator. More complex robot control schemes have also been implemented using map-based graphical user interfaces, on which an operator may designate a path and a destination corresponding to Global Positioning System (GPS) coordinates. While these methods simplify the task of controlling a remote vehicle, such approaches require high resolution computer graphical displays, and complex information about the terrain and obstacles. Such GPS coordinate systems can be subject to failure or limited usefulness due to unavailable or inaccurate GPS satellite data, including indoor and underground environments where GPS satellite signals cannot be received.

To extend the usefulness of remote vehicles, a control system and methodology is needed that can be more effective in many environments and with minimal intrusion on the human operator's freedom of motion, focus, and action.

A weapon-mounted hand-held controller having a gyroscopic motion tracker is known for use with 'virtual reality' training and simulation of combat, in which the hand-held controller is used to move the soldier's actor view through simulated realities that are displayed graphically through a full immersion head mount display. When the weapon-mounted single-hand controller is used in such a 'virtual reality' mode, the operator may change his own apparent position in the graphically-generated world image that is displayed on his head-mount viewer. A motion tracker incorporated in the hand-held controller is used to track the aiming of the soldier's weapon in the virtual world and to determine the apparent target of simulated weapon firings. This system has been proven effective and not overly encumbering to the actions of a soldier in training simulations of a wide range of dismount combat situations (see Quantum3D Expedition DI product, for example).

SUMMARY OF THE INVENTION

The present invention provides a system for controlling a remote vehicle. The system comprises a hand-held controller including a laser generator for generating a laser beam. The hand-held controller is manipulable to aim and actuate the laser beam to designate a destination for the remote vehicle. The remote vehicle senses a reflection of the laser beam and moves toward the designated destination.

A unique code corresponding to the remote vehicle may be embedded in laser beam. The hand-held controller may allow single-handed control of the remote vehicle and one or more of its payloads and may include an adjustable or replaceable hand grip. Additional input devices may be located on the hand-held controller, the input devices comprising at least a joystick or puck. Input device location may be adjustable to fit a size of a user's hand.

The present invention also provides a system for controlling a remote vehicle. The system comprises a hand-held controller allowing single-handed control of a remote vehicle and one or more of its payloads. The hand-held controller includes a laser generator for generating a laser beam, the hand-held controller being manipulable to aim and actuate the laser beam to designate a destination for the remote vehicle.

The remote vehicle senses a reflection of the laser beam from the designated destination and moves toward the designated destination. A unique code corresponding to the remote vehicle can be embedded in laser beam. The hand-held controller may include an adjustable or replaceable hand grip. Additional input devices may be located on the hand-held controller, the input devices comprising at least a joystick or puck. The input device location may be adjustable to fit a size of a user's hand.

The present invention further provides a method for controlling a remote vehicle via a laser beam. The method comprises encoding control signals for a remote vehicle into a laser beam that is aimed and sent to a designated destination for the remote vehicle, sensing a reflection of the laser beam, decoding the control signals for the remote vehicle, and moving toward the designated destination. The control signals include a unique code corresponding to the remote vehicle, and a sensor on the remote vehicle senses the reflection of the laser beam and decodes the unique code to ensure that it corresponds to the remote vehicle before acting on the control instructions.

The present invention still further provides a method for controlling a remote vehicle. The method comprises enabling a laser designator mode on a remote vehicle, illuminating a designated destination for the remote vehicle with a laser beam, searching for the designated destination with a sensor on the remote vehicle, determining whether a unique code embedded in the laser beam corresponds to the remote vehicle when the remote vehicle senses a laser beam designating a destination, calculating a vector angle from the sensor input to the designated destination, computing a trajectory to the designated destination, and moving the remote vehicle to the designated destination when the unique code embedded in the laser beam corresponds to the remote vehicle.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION OF THE INVENTION

The present invention contemplates a system and method for controlling remote vehicles such as a tele-operated remote control vehicles (embodied herein by robots). The system and method allow an operator to utilize a control device operable (even using one hand) via intuitive methods that allow the operator to perform other tasks. An embodiment of the present invention includes a hand-grippable control device with the capability to control a remote vehicle by pointing a laser designating beam at a desired destination or along a desired path.

An embodiment of the present invention also contemplates an intuitive pointing method for controlling the actions of a remote vehicle. A laser beam designates desired endpoints for remote vehicle actions. According to an embodiment of the invention, a laser beam designator, including a unique code identifying a specific remote vehicle, is detected by a sensor mounted on the remote vehicle. Once the remote vehicle's laser detection sensor and associated electronics recognizes the uniquely-coded laser beam, the remote vehicle can acknowledge acquisition of the designator laser beam. The location of the laser beam's reflection from the desired target to the remote vehicle's current position, as determined by the remote vehicle's laser sensor, becomes a motion vector directing the remote vehicle automatically toward the target location using a trajectory-calculating control algorithm.

The motion of the remote vehicle can be stopped at an intermediate location using a laser designator encoded with a stop code, or via another command that disables the motion. If equipped with range finding capability to determine the distance to the designated target, the robot can automatically stop after the range distance is traversed.

The present invention contemplates allowing another operator to take control of the remote vehicle by passing the unique code for the remote vehicle to another operator via, e.g., using a wireless communication link or physical key. The new operator can use another laser designator to control of the remote vehicle. The ability to pass the unique code for a remote vehicle to a new operator may enable other personnel with a better view of a desired destination to direct the remote vehicle's travel. Similarly, the unique code can be passed to another vehicle, such as a manned or unmanned aerial vehicle (UAV), which may have line of sight to the desired destination of the remote vehicle.

Figure 3:
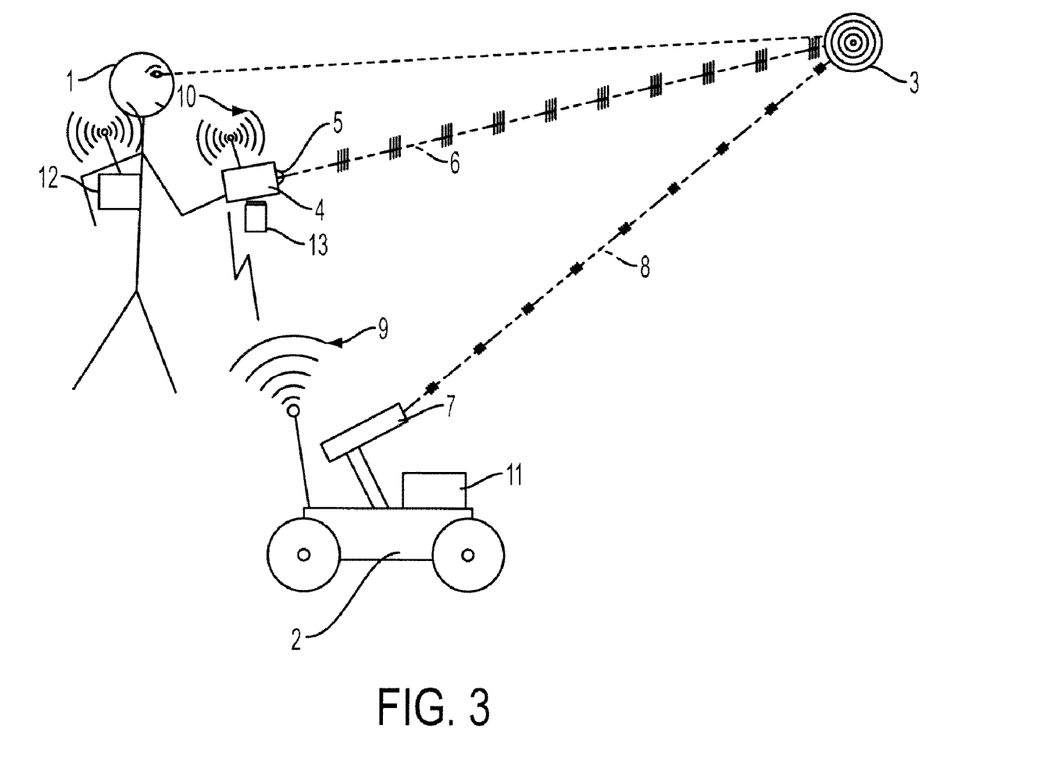
FIG. 3 schematically illustrates elements of an embodiment of a control system that operates in accordance with the present invention.

FIG. 3 illustrates an exemplary embodiment of a remote vehicle and an exemplary control system. A user or operator 1 holds a hand-held controller 4, preferably capable of being manipulated to control a remote vehicle 2 with a single hand. The hand-held controller 4 includes a laser generator 5 that sends a laser designation beam 6 toward a target destination 3 for the remote vehicle. The laser designation beam preferably includes a unique code for the remote vehicle 2, which may be created by pulse repetition or pulse width modulation of the laser beam 6.

In an exemplary embodiment of Pulse Repetition Frequency (PRF), designator and seeker (i.e., the remote vehicle) pulse coding uses a truncated decimal system including the numerical digits 1 through 8. The codes are directly correlated to a specific PRF. A three- or four-digit code is commonly set. Three-digit code equipment settings range from 111 to 788. Four-digit code equipment settings range from 1111 to 1788. The three- and four-digit code equipment is compatible, and any mix of equipment can be used in all types of laser operations. However, when using a mix of three- and four-digit code equipment, all personnel must understand that the first digit of a four-digit code is always set to numerical digit 1. The remaining three digits will be set to match the three digits of the three-digit code equipment. As an example, a three-digit code of 657 would be set to 1657 on a four-digit code system or vice versa.

A sensor 7 mounted to the remote vehicle 2 includes a detector element and a discrimination circuit, which can read and interpret the unique code embedded in the laser beam 6. The sensor 7 detects a reflection of the laser beam and determines a vector from the remote vehicle to the reflection to locate the target destination. The target designation is that which emits the strongest reflection.

The hand-held controller 4 can preferably be used either independently or mounted to a tool, for example a military weapon. In an embodiment of the invention, the laser beam 6 includes visible or invisible wavelengths (e.g., a coherent wavelength that travels in a straight line), and the laser generator 5 includes electronics to modulate the laser beam and thereby encode it with the unique remote vehicle code. In addition to the unique code, the laser beam could include embedded instructions to use a new code for enhanced security or so that another operator can begin controlling the remote vehicle. In addition, a preferred speed for attaining the target can be encoded in the laser beam. It is preferable to use invisible wavelengths that cannot be detected by unintended individuals. In addition, it is preferable that the wavelength not cause eye damage (eye-safe can include, e.g., 1.2-1.7 nanometers) to a person accidentally in its path.

In an embodiment of the invention, a communication link 9, 10 exists between the remote vehicle 2 and the hand-held controller 4, and may be wired or wireless. The link 9, 10 may be used to communicate confirmation that the remote vehicle's sensor 7 has identified the laser beam 6. The link 9, 10 may also be used to communicate a signal to enable or disable the remote vehicle's response to detection of the laser beam, allowing the user to start and discontinue motion of the remote vehicle 2 in the direction of the target destination 3.

The illustrated system also includes a processor 11 on the remote vehicle 2 for reading the unique code embedded in the laser beam 6 and determining if the unique code matches a code assigned to the remote vehicle 2. Another processor 12 in the operator's control system stores the unique code for the remote vehicle 2 and sends it to be encoded for transmission by the laser generator 5. This processor 12 can also respond to the operator 1 actuating the hand-held controller 4 and correlate those actions to control functions of the remote vehicle and/or its subsystems.

Alternatively, a secure physical key 13, having the unique code for the remote vehicle 2, is provided to allow the hand-held controller 4 to send the unique code with the laser beam 6. Alternatively means to authorize control of the remote vehicle are contemplated by the present invention including, for example, a biometric safety device could be used such as finger print or iris scanning.

In view of the above, embodiments of remote vehicles and control systems are disclosed that make conventional control of remote vehicles less cumbersome and less complex for an operator. Intuitive control methods and hand-held controllers that can be operated effectively by one hand enable control of remote vehicles without requiring an unnecessary amount of the operator's visual attention and hand control. In addition, the disclosed method and device may reduce the requirements for operator training and skill level by utilizing simple pointing techniques and an ergonomic control device designed to integrate with other tools.

Figure 4A:
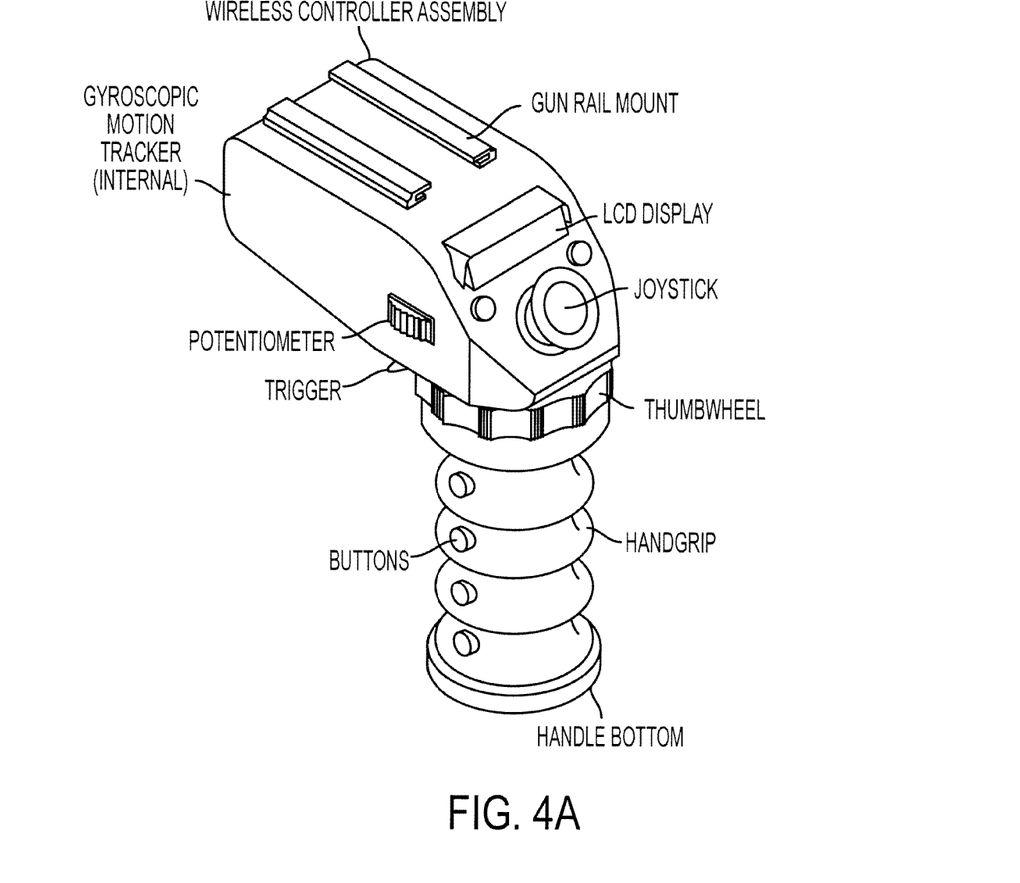
FIG. 4A is a perspective view of an embodiment of a hand-held controller of the present invention.

FIG. 4A is a perspective view of an embodiment of a hand-held controller of the present invention. A hand grip is preferable sized for a single human hand and may additionally be adjustable to fit a variety of hand sizes. Functional buttons are located on the hand grip portion in this illustrated embodiment. As can be seen, a functional button can be located in each hand grip recess, allowing actuation by the user selectively squeezing individual fingers. In an embodiment of the invention, a certain minimum force is required to actuate these buttons t prevent inadvertent actuation. On top of the hand grip is a head unit including a joystick, one or more functional buttons, a speed analog potentiometer thumbwheel, a message display area, and a gun rail mount. A gyroscopic motion tracker may be located within the head unit. Between the hand grip and the head unit is a mode thumbwheel.

The joystick may be 2-axis analog. In an embodiment of the invention, analog-to-digital resolution of the joystick is at least 12-bit per axis with the joystick center "dead band" (maximum offset from center on spring return) being less than about 3% of total resolution. If pressed, the joystick can function as a digital button. The present invention also contemplates using a puck (6 degrees of freedom) instead of a joystick.

A secure physical key can be inserted into the hang grip, preferably from a bottom surface thereof. The secure physical key contains the unique code for an intended remote vehicle.

Figure 4B:
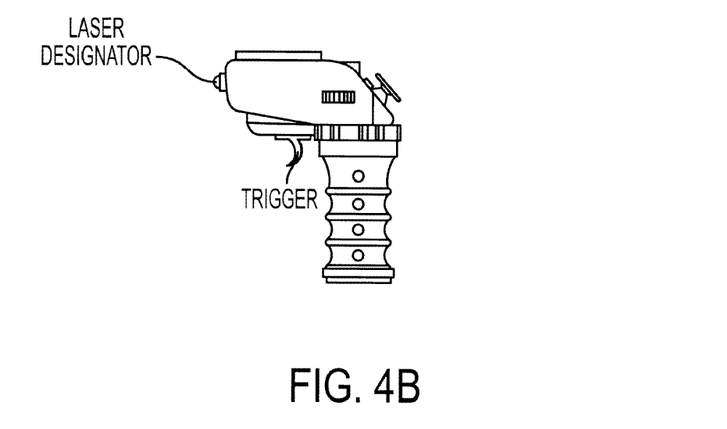
FIG. 4B is a side view of an embodiment of a hand-held controller of the present invention.

As illustrated in FIG. 4B, a trigger is located under the head unit and in front of the hand grip. In an embodiment of the invention, a button (e.g., a mouse click-type button) can be used instead of a trigger. A laser generator is located in front of the head unit and is actuated by the illustrated trigger.

The hand-held controller may be used standalone or attached to a weapon or other tool via, for example, a gun rail mount located on the head unit. In an embodiment of the invention, the hand grip is adjustable in size by a basic change of the grip exterior housing. Similarly, the location of function buttons may vary, for example in rotation about the vertical axis of the hand grip so as to ergonomically accommodate the distal end of fingertips at the position of the buttons. According to an embodiment of the invention, the input devices (buttons, thumbwheels, joystick) are arranged to allow single-handed operation.

The joystick may be thumb-operated, for example to indicate corresponding directions of motion and desired relative velocity of action by rate and or range of throw of the joystick about its center of travel in two dimensions. The trigger can be used as a selector input, and function buttons arranged to lie under finger or thumb and can be programmed or be designated to correspond to functions or modes of operation that are relevant for a specific remote vehicle. A thumb-actuated mode selector switch, illustrated as a thumbwheel, can be rotated to a limited number of defined rotary positions to select alternative modes of robot operation. One mode would include a laser designation mode, signaling the remote vehicle to look for a laser designation with its unique code. This mode selector switch can have each of its positions clearly labeled, and can change functionality of the input devices to increase the potential permutations of use for a more limited number of input devices.

Exemplary modes of operation that can be selected via the mode selector switch include driving the motion axes of the remote vehicle chassis, selection of a subsystem (or payload) such as a sensor head, a camera, or a manipulator arm. The speed analog potentiometer thumbwheel is located so as to be thumb- or finger-actuated to enable the setting of analog remote vehicle functions, for example, speed of motion, lighting levels, zoom factor for cameras, etc.

The gyroscopic motion tracker detects motion of the hand-held controller caused by the operator's hand and arm. In an embodiment of the invention, the gyroscopic motion tracker is a dual-axis miniature rate gyroscope, such as the Intersense InertiaCube3 or the Gyration MG1101. Upon being enabled, for example by pressing a button on the hand-held controller, the actual motion in free space of the hand-held controller provides operator control similar to that of a virtual mouse (or virtual joystick, puck, trackball, stylus, etc.). Thus, the gyroscopic motion tracker provides another way to control the remote vehicle's axes of motion or the motion of a payload/subsystem.

In an embodiment of the present invention, the hand-held controller of the present invention is intended to be used without requiring the operator to look at a display of any type, either on a console or via a head-mounted display. This simplifies remote vehicle operation and increases the operator's situational awareness. Another embodiment of the invention, however, includes a head-mounted display worn by the user for view feed from cameras of the remote vehicle and a graphical user interface (GUI), the gyroscopic motion tracker can also allow the user to navigate through the GUI and select information without releasing the hand controller or his tool/weapon. Although a head-mounted display is preferable because it allows the user to control the remote vehicle while maintaining a degree of situational awareness and perhaps accomplishing other tasks, other displays such as a laptop monitor or the console of FIG. 2 may be used with the hand-held controller described herein.

In accordance with an embodiment of the invention, a laser generator on the hand-held controller and a laser sensor on the remote vehicle use a pulse modulation system to ensure that a specific remote vehicle and hand-held controller can communicate. By setting the same unique code in both the laser generator and the remote vehicle, the remote vehicle will only recognize designated locations generated by a matching laser generator. In an embodiment of the invention, the laser modulation method used to encode the unique code on the designator beam may typically be a pulse coding or a pulse width method. An example of a pulse repetition coding scheme is set forth in more detail below.

The remote vehicle's laser sensor 7 can be any sensor that can measure the wavelength of the laser generated by the hand-held controller. In an embodiment of the invention, the sensor 7 mounted on the remote vehicle includes a quad detector, which is a silicon sensor that can measure the output energy of many common lasers. In an embodiment of the invention, the remote vehicle's sensor is an Advanced Photonics SD 551-23-41-221 sensor. In another embodiment of the invention, the sensor 7 mounted on the remote vehicle includes a microbolometer which is a long wavelength infrared (IR) sensor. A microbolometer includes a wider field of view than a quad sensor, and thus requires less mechanical scanning to locate a designator beam. The present invention also contemplates using other sensors that are sensitive to the wavelength emitted by the laser designator, particularly in the category of area array detectors, which can have fields of view of up to 120°. A quad detector typically has a field of view of about 15°. A sensor with a wider field of view typically locates a designator beam more quickly than a narrower field of view. Indeed, with a suitably wide field of view, no mechanical scanning may be required to locate the designator beam.

Figure 5:
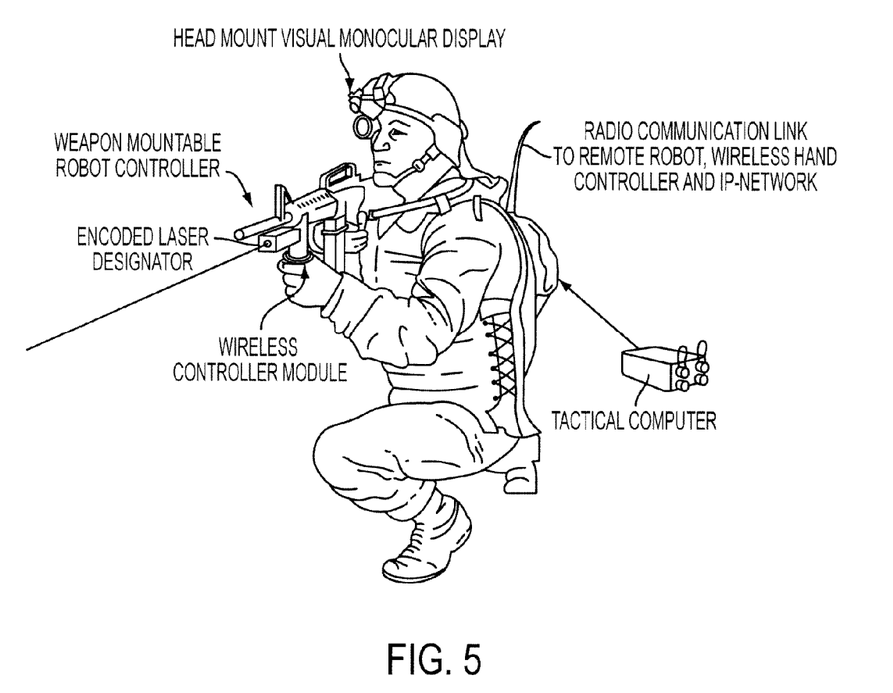
FIG. 5 illustrates an embodiment of a hand-held controller of the present invention, integrated with a user's weapon.

FIG. 5 illustrates an embodiment of a hand-held controller of the present invention, integrated with a user's weapon. As illustrated, the user wears a head-mounted display allowing the user to view both a graphical user interface providing remote vehicle information and control, and a video stream from one or more cameras of the remote vehicle. As stated above, the present invention contemplates using the hand-held controller without such a head-mounted display. A hand-held controller is mounted to the user's weapon at a convenient location, for example in a front grip location. A standard rail mount may be used to secure the hand-held controller to the weapon. A processor performs necessary processing for the control system and provides communication (wired or wireless) between the mead-mounted display and the hand-held controller. This control system (the hand-held controller, processor, and head-mounted display) allow the soldier to operate a remote vehicle while still holding his weapon at ready and maintaining a degree of situational awareness. The hand-held controller can be removed from the weapon and used as a standalone unit, in situations where a weapon or tool is not useful to the operator.

The hand-held controller may be mounted in any location on a user's weapon or other tool that does not impede the user's performance of his duties and enables the laser generator to send a laser bean to a designated target location.

In an embodiment of the invention, the processor 12 (see FIG. 3) is a rugged laptop computer or other suitably powerful processor including, for example, a tablet PC or tactical computer. The processor communicates with the remote vehicle wirelessly or via a tether (e.g., a fiber optic cable). Although wireless communication may be preferable in some situations of remote vehicle use, potential for jamming and blocking wireless communications makes it preferable that the control system be adaptable to different communications solutions, in some cases determined by the end user at the time of use. A variety of radio frequencies (e.g., 802.11), optical fiber, and other types of tether may be used to provide communication between the processor and the remote vehicle.

The processor must be within a workable distance of the operator and the remote vehicle. In an embodiment of the invention, the processor is carried by the user, preferably on the user's back, for example in a backpack.

As stated above, the processor must additionally communicate with the hand-held controller and the display. In a preferred embodiment of the invention, the processor is capable of communicating with the hand-held controller and the display either wirelessly or using a tether. To facilitate wireless communication among the various elements of the system, the processor includes a radio and an antenna.

It addition, the processor includes software capable of facilitating communication among the system elements, and controlling the remote vehicle. In an embodiment of the invention, the software is a proprietary software and architecture, including a behavioral system and common OCU software, which provide a collection of software frameworks that are integrated to form a basis for robotics development. According to an embodiment of the invention, this software is built on a collection of base tools and the component framework, which provide a common foundation of domain-independent APIs and methods for creating interfaces, building encapsulated, reusable software components, process/module communications, execution monitoring, debugging, dynamic configuration and reconfiguration as well as operating system insulation and other low-level software foundations like instrument models, widget libraries, and networking code. In an embodiment of the invention, the processor performs all of the data processing for the control system.

Functions that may be performed by the input devices on the hand-held controller include driving the remote vehicle (forward, backward, left, and right), aim and activate a laser designation for the remote vehicle, camera selection and control, weapon control, flipper control, navigation and select among the soft buttons of a GUI displayed by the head-mounted display, robot light setting, robot speed, bringing up a menu within the GUI (e.g., that that allows the user to select a screen layout, a robot to control, select a safe mode for the robot (such as observe mode), manage and play video, audio and snap shot recordings, etc.), remote vehicle pause or brake, power on/off, etc.

The head-mounted display generally indicates a display device worn on a user's head or as part of a helmet, which has a display optic in front of one or both eyes. A typical head-mounted display has one or two displays with lenses and semi-transparent mirrors embedded in a helmet, eye-glasses, or a visor. The display units are miniaturized and may include cathode-ray tubes (CRTs), liquid crystal display (LCD), Liquid Crystal on Silicon (LCos), or an organic light-emitting diode (OLED).

As stated above, the head-mounted display allows the remote vehicle operator to see what the remote vehicle sees through one or more cameras, so that the remote vehicle can be controlled when it is not within the operator's line of sight, and also allows the operator to maintain situational awareness. In an embodiment of the invention, the head-mounted display is an Icuiti tactical display.

The head-mounted display displays a GUI with views from the robot's camera(s) and information about the robot such as battery life, payloads, communication status, etc., and also displays soft buttons that are mapped to the hand-held controller buttons and allow the user to more intuitively control the robot using the hand-held controller. The head-mounted display is preferably capable of either wireless or tethered communication with the hand-held controller through the processor.

Figure 6:
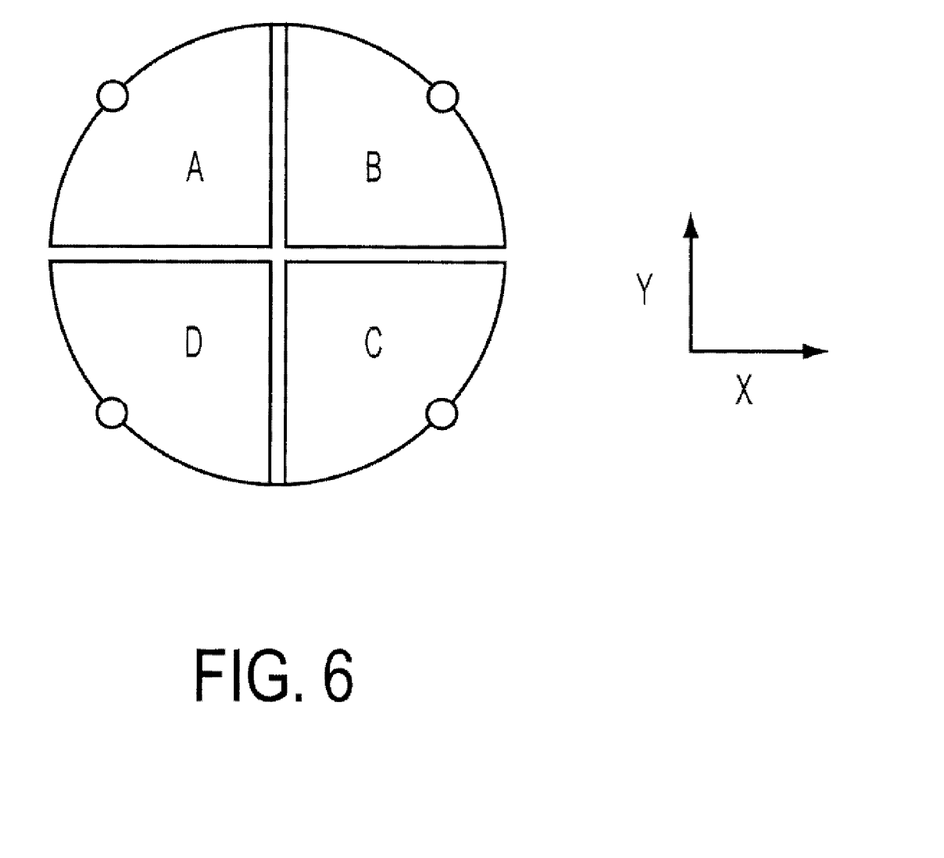
FIG. 6 illustrates a principle of operation of a quad detector sensor used with a laser designator detector according to an embodiment of the invention.

A menu mode, controllable by an input device of the hand-held controller allows the user to navigate among soft buttons or icons of the GUI. Exemplary embodiments of the GUI display are illustrated in FIGS. 6 and 7.

Figure 7:
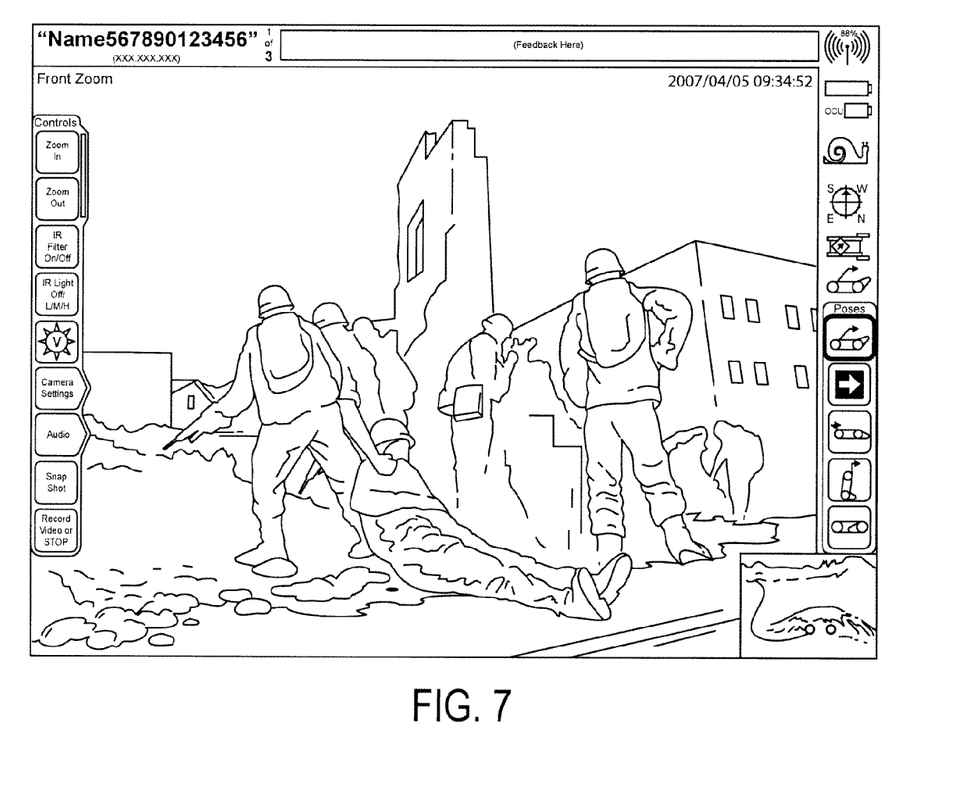
FIG. 7 is an embodiment of an optional user interface for use with the present invention.

As illustrated in the embodiment FIG. 7, a display provides the user with a variety of information in what is indicated as a "max camera" layout. In this illustrated embodiment, the main image is a video stream from the robot's attack camera and the smaller image in the lower right corner is video stream from the robot's drive camera. As an alternative to video streams, a series of snapshots can be displayed at predetermined time intervals. The status of the attack camera (e.g., front zoom) is displayed in the upper left corner, and certain camera control icons or soft buttons are presented under the camera status. In this embodiment, the icons include zoom in, zoom out, IR filter on/off, IR light off/low/medium/high, camera default position (designated in this embodiment as a V in a sun shape), camera setting choices, audio choices, snap shot, and video record on/off. In this embodiment, upon choosing (by pressing the soft button or icon by manipulating the hand-held controller in the menu mode) camera settings and audio, the GUI pops up a screen to select among a variety of setting options. In an embodiment of the invention, the icons can be minimized. Above the status of the camera, the robot's name can be displayed (illustrated herein as "Name567890123456").

The camera may be returned to its default position, or otherwise controlled, via the soft button mentioned above, or a button on the hand-held controller.

Additional icons or soft buttons may be displayed, for example on the right side of the head-mounted display view. In this embodiment, the icons or soft buttons include, from top to bottom, status of communication link (with robot), battery charge level (of the robot and the OCU), speed toggle (wherein the snail icon indicates that the robot is in a slow range of speed within the available scalable range of speed), robot heading, two icons indicating the robot's position and heading, and a variety of autonomous assist options such as predefined poses.

Figure 8:
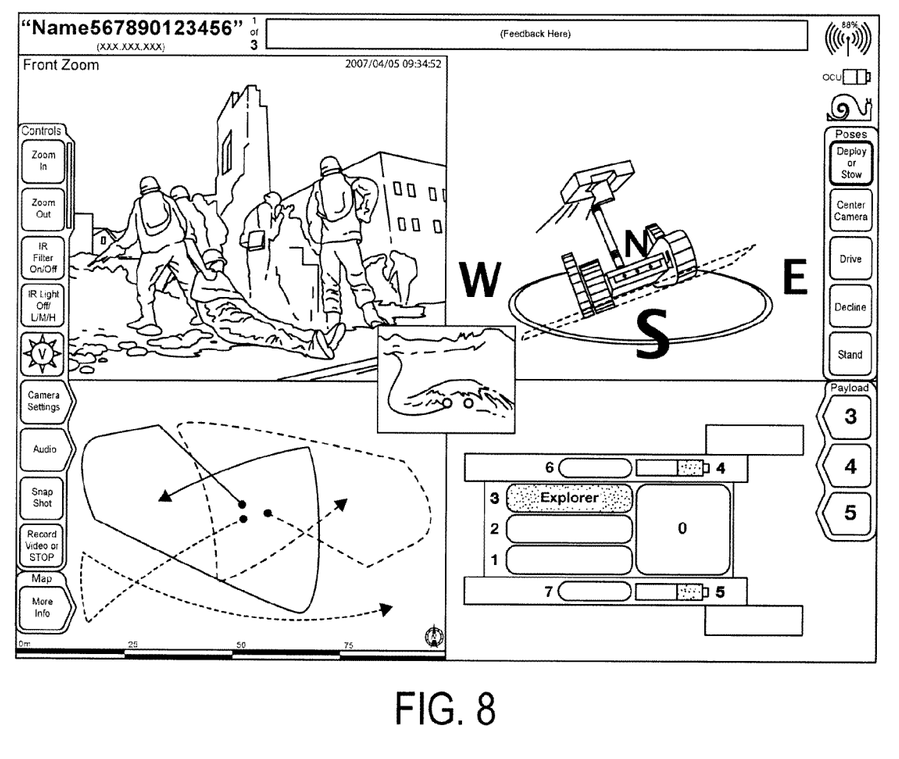
FIG. 8 is another embodiment of an optional user interface for use with the present invention.

Another embodiment of the system's GUI, indicated as a "quad" layout, is illustrated in FIG. 8. The larger, upper left image is a video stream from the robot's attack camera and the smaller image in the center of the display is video stream from the robot's drive camera. As an alternative to video streams, a series of snapshots can be displayed at predetermined time intervals. The status of the attack camera (e.g., front zoom) is displayed in the upper left corner, and certain camera control icons or soft buttons are presented under the camera status, as set forth for the prior embodiment. In an embodiment of the invention, the icons can be minimized. Above the status of the camera, the robot's name can be displayed (illustrated herein as "Name567890123456"). Under the camera controls is a map icon allowing the user to select additional information from the system's mapping function. To the right of the map icon and under the video stream from the attack camera, mapping information regarding one or more of the robot's prior mission movements can be displayed. Alternatively, the missions of a number of nearby robots are displayed.

Additional icons or soft buttons may be displayed, for example on the right side of the head-mounted display layout. Similar to the previous embodiment, the icons or soft buttons include, from top to bottom, status of the communication link (with robot), battery charge level (of OCU), speed toggle wherein the snail icon indicates that the robot is in a slow range of speed (within the available scalable range of speed), and a variety of autonomous assist options such as predefined poses. In this embodiment, the poses are indicated by name rather that a graphical representation of the pose itself. Payload icons under the pose icons allow the user to activate a payload or bring up a control menu for that payload. They can also display information regarding selected payloads. Possible payloads include cameras, chemical detection devices, sniper detection devices, cable spools, batteries, etc. In the illustrated embodiment, payload 3 is an Explorer extension added to the chassis of the robot, and payloads 4 and 5 are batteries.

To the right of the video stream from the robot's attack camera is a representation of the robot's position and heading, including any tilt. Under the positional representation is an identification of the payloads and information regarding the payloads, such as an indication of remaining battery life.

In an embodiment of the invention including a special camera on the remote vehicle, e.g., a microbolometer or laser in visible spectrum, the laser designated target could be visible to the operator via the illustrated GUIs of FIGS. 6 and 7 by displaying the special camera output in addition to or instead of one or more of the video streams.

In accordance with the present invention, the user may choose among a variety of GUI layouts, such as the "max camera" and "quad" layouts described above.

Figure 9:
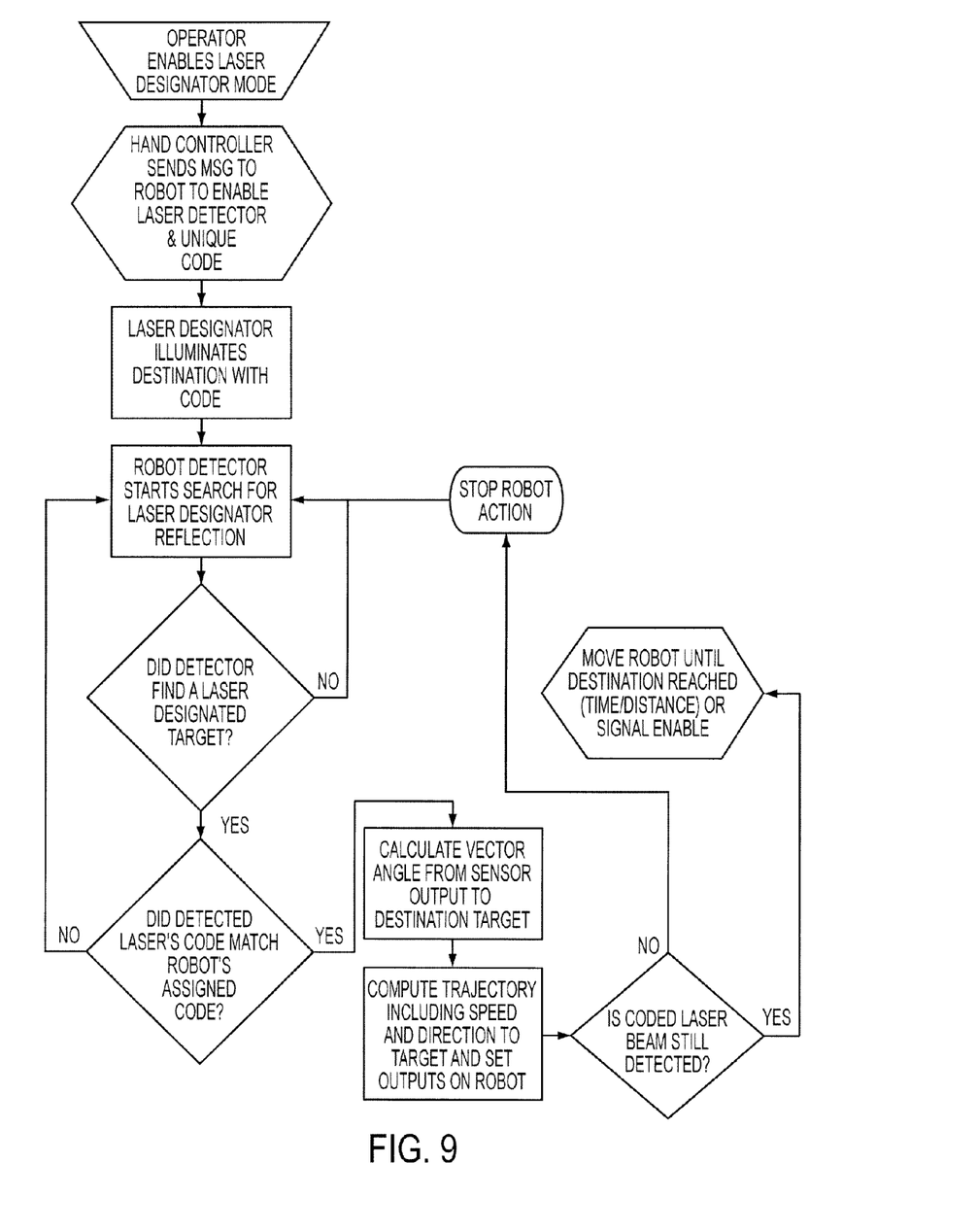
FIG. 9 is a flowchart illustrating an embodiment of a remote vehicle control method using a laser designator.
Figure 10:
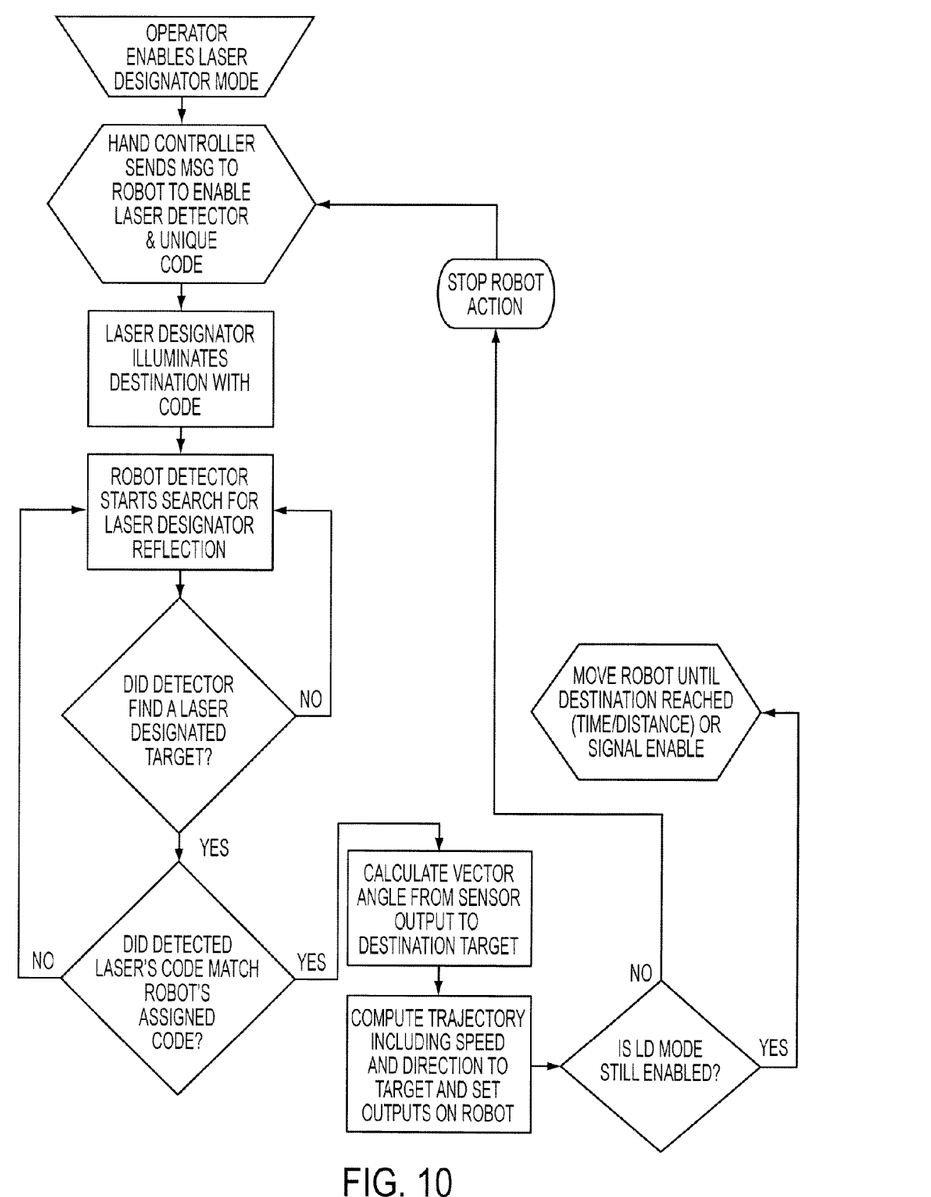
FIG. 10 is a flowchart illustrating another embodiment of a remote vehicle control method using a laser designator.

FIGS. 9 and 10 are flowcharts illustrating exemplary embodiment of algorithms for implementing control guidance using a laser generator on a hand-held controller. Two modes of operation are illustrated, though many others are possible using the same or similar principles.

In the embodiment of FIG. 9, the operator/user enables a laser designation mode on the hand-held controller, which sends a message to the remote vehicle to enable its laser sensor. The laser generator sends a laser beam to illuminate a target destination for the remote vehicle. The laser beam includes a unique code for the intended remote vehicle. The laser sensor on the remote vehicle begins to search for a laser beam reflection and, if it finds one, checks whether the unique code embedded in the reflected beam matches its own unique code. If not, the sensor continues search for a laser beam reflection containing its unique code while the laser designation mode is enabled. If the unique code embedded in the reflected beam matches its own unique code, the remote vehicle's processor uses information from the sensor to calculate a vector angle to the location designated by the laser beam. Thereafter, the remote vehicle's processor computes a trajectory including to the designated location and sets remote vehicle output accordingly (including speed as pre-set or indicated by the operator). As long as the hand-held controller remains in laser designation mode, the remote vehicle will continue to move toward the designated location. Alternatively or additionally, the remote vehicle continues toward the designated location while the laser beam is still detected by the remote vehicle's sensor. Alternatively or additionally, the remote vehicle continues toward the designated location until a stop code is embedded in the laser beam, or the user issues another command that disables the remote vehicle's motion.

The present invention also contemplates embedding other commands into the laser beam. Indeed, given the possibility of embedding a great deal of remote vehicle control commands, an embodiment of the invention includes only a laser beam for communication from the operator to the remote vehicle. Laser beams can travel great distances, certainly greater that maintainable wireless communication networks in many cases. Without the spatial limitations of wired or wireless communication between the operator and the remote vehicle, the operator can control a remote vehicle via laser from greater distances, including miles away.

FIG. 6 is a diagram of an example of a quad sensor and an equation for deriving the X and Y coordinates of the laser beam spot on the sensor. A quad detector is a large-area silicon position-sensitive detector that detects and records the positions of incident light beams. In particular, it senses the position of the centroid of a beam in the x-y plane orthogonal to the optic axis. Four electrodes are attached to the detector, and the four currents generated by photoabsorption are processed with the appropriate algorithm to give the x and y positions.

The quadrant detector can be, for example, a uniform disc of silicon with two 10 µm-wide gaps across the surface, creating four independent and equal photodetectors on the sensing surface. The center of the detector is known very accurately since it is the mechanical intersection of the two gap lines and does not change with time or temperature. A symmetrical laser or optical beam centered on the detector will generate equal photocurrents from each of the four sectors. If the beam moves from the center of the detector, the currents from the four sectors will change and the processing algorithm will give the x and y displacements relative to the center.

FIG. 6 illustrates the geometry of a quad detector. The four sectors are represented by letters A, B, C, and D. The equations used to describe the x and y displacements of the beam are the following:

$$x = \frac{(b+d)-(a+c)}{a+b+c+d}$$
$$y = \frac{(a+b)-(a+d)}{a+b+c+d}$$

where a, b, c, and d are the currents generated by each of the four sectors. Two restrictions are generally placed on the beam for these equations to give meaningful results: the beam must always overlap all four sectors, and beam motion is limited to small displacements. If a beam only overlaps two sectors of the quad cell, the equations will only be able to provide a value for one of the coordinates, not both. A beam that only overlaps sectors A and B will not cause a signal to be generated by sectors C and D. Consequently, the x- and y-coordinate equations reduce to the following:

$$x = \frac{b-a}{a+b}$$
$$y = \frac{a+b}{a+b} = 1$$

It is clear that, regardless of the vertical position of the beam, y will always equal unity when only sectors A and B are illuminated.

Furthermore, with regard to the present invention and each of the embodiments discussed hereinabove, although reference has been made to remote vehicles for military use, it is to be understood that any of the features set forth in the above-discussed embodiments also apply to other types of remote vehicles—including, for example, companion robots, lawn mowing robots, house-cleaning robots, virtual pets, and/or any other suitable remote vehicle in which guidance toward a designated location may be facilitated using an encoded laser beam signal and/or a hand-held controller that can be manipulated with one hand.

What is claimed is:

1. A method for controlling a remote vehicle, comprising:
enabling a laser designator mode on a remote vehicle;
illuminating a designated destination for the remote vehicle with a laser beam;
searching for the designated destination with a sensor on the remote vehicle;
determining whether a unique code embedded in the laser beam corresponds to the remote vehicle when the remote vehicle senses a laser beam designating a destination;
calculating a vector angle from the sensor input to the designated destination;
computing a trajectory to the designated destination; and
moving the remote vehicle to the designated destination when the unique code embedded in the laser beam corresponds to the remote vehicle.

2. The method of claim 1, wherein searching for the designated destination comprises searching for a reflection of the laser beam from the designated destination.

3. The method of claim 1, wherein enabling the laser designator mode and illuminated the designated destination are accomplished via single-handed control.

4. The method of claim 3, wherein single-handed control is effected with a hand-held controller.

5. The method of claim 4, wherein the hand-held controller is mounted on or integrated with a tool.

6. The method of claim 5, wherein the tool is a weapon.

7. The method of claim 6, further comprising operating the remote vehicle while holding the weapon at ready and maintaining a degree of situational awareness.

8. The method of claim 4, wherein the hand-held controller includes a hand grip.

9. The method of claim 8, wherein at least one input device is located on the hand grip.

10. The method of claim 9, including at least two input devices located on the hand-held controller, the input devices comprising at least a joystick or puck.

11. The method of claim 8, wherein the hand grip is adjustable to fit a size of a user's hand.

12. The method of claim 9, wherein a location of the input device is adjustable to fit a size of a user's hand.

13. The method of claim 4, wherein the hand-held controller includes a replaceable hand grip selected to fit a size of a user's hand.

14. The method of claim 1, further comprising performing a designated task when the remote vehicle reaches the designated destination.

15. The method of claim 14, wherein the task comprises ordnance disposal.

16. The method of claim 14, further comprising communicating instructions for performing the task to the remote vehicle via the laser beam.

17. The method of claim 1, further comprising stopping the remote vehicle before the remote vehicle reaches the designated destination.

18. The method of claim 17, further comprising stopping the remote vehicle by disabling remote vehicle motion.

19. The method of claim 18, further comprising embedding a stop code in the laser beam.

20. The method of claim 1, wherein a processor calculates the vector angle from the sensor input to the designated destination.

21. The method of claim 20, wherein the quad detector comprises a uniform silicon disc.

22. The method of claim 21, wherein the quad detector comprises two gaps across the uniform silicon disc that create four independent and equal photodetectors.

23. The method of claim 22, wherein the gaps have a width of approximately 10 μm.

* * * * *